March 10, 1953 A. L. THURAS 2,631,271
TUBULAR HYDROPHONE
Original Filed April 28, 1949
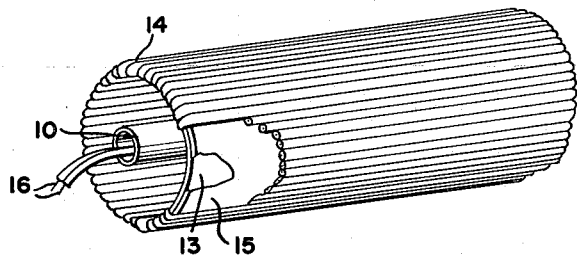
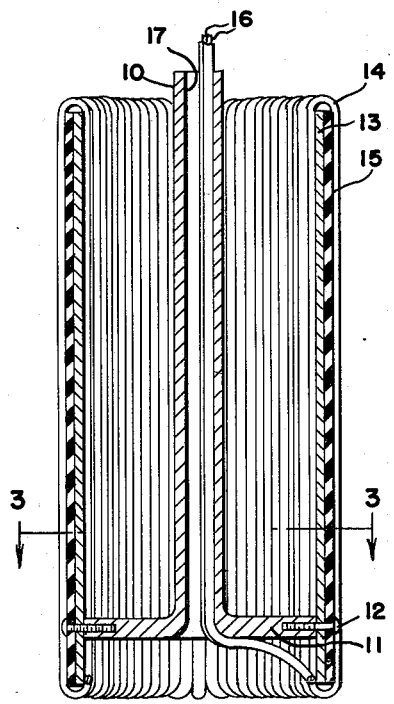
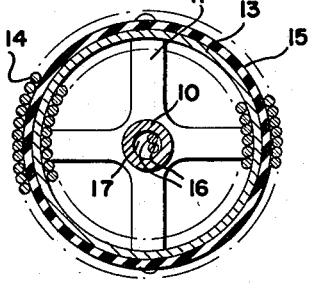
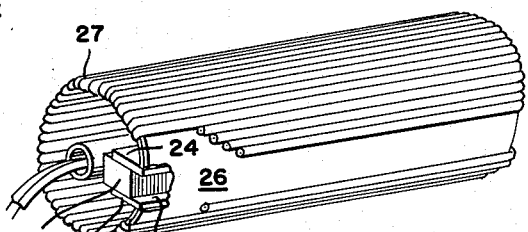
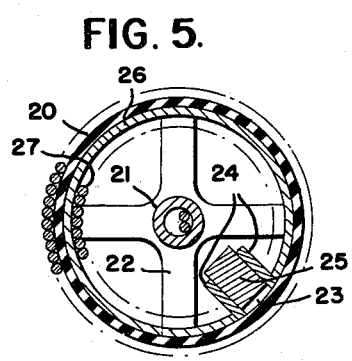
INVENTOR
ALBERT L. THURAS, DECEASED,
By NATIONAL BANK OF COMMERCE
OF NEW LONDON CONNECTICUT, ADMINISTRATOR
B. L. Zangarll
BY George Sipkin
ATTORNEYS Patented Mar. 10, 1953

2,631,271

UNITED STATES PATENT OFFICE 2,631,271

TUBULAR HYDROPHONE

Albert L. Thuras, deceased, late of New London, Conn., by National Bank of Commerce, New London, Conn., administrator, assignor to the United States of America as represented by the Secretary of the Navy Original application April 28, 1949, Serial No. 90,248, now Patent No. 2,521,136, dated September 5, 1950. Divided and this application April 5, 1950, Serial No. 154,042

2 Claims. (Cl. 340—11)

The invention described herein is a division of parent application Serial Number 90,248, filed April 28, 1949, on behalf of Albert L. Thuras, deceased, for "Hydrophone," now U. S. Patent No. 2,521,136, granted September 5, 1950.

The present invention relates to a device for generating or receiving sound signals at sonic or ultrasonic frequencies, and more particularly to an underwater transducer of the tubular magnetostrictive type having a toroidal-wound coil for converting compressional wave energy into electrical energy or vice versa.

The transducer includes a magnetostrictive tube supporting a toroidal-wound coil and subjected to a magnetic field alternating at various frequencies reaching into the ultrasonic region. The tube expands and contracts radially along the direction of the magnetic lines of force at the frequency of the alternating magnetic field.

The magnetostrictive transducer is reversible and can be used to receive an acoustic signal in response to the pressure of an alternating compressional wave as well as to radiate acoustic energy under an electric driving force.

The physical radial expansion and contraction of the tube forms the source of compressional wave energy and when the tube is under water, this energy is propagated through the water medium as an acoustic signal receivable by a suitable receiving device.

When used as a receiver, a compressional wave of energy striking the magnetostrictive tube causes it to alternately expand and contract. As the tube is polarized by a magnetic field, this tube expansion and contraction causes the flux linkages between this field and the coil to induce an electromotive force in the coil which is fed to a suitable detecting means.

An object of the invention is to provide a transducer that is of light construction but yet sufficiently rugged to withstand the use to which it is put.

Another object is to provide a transducer that is simple to construct and has a sufficiently low cost of manufacture that it may be made expendable or discarded after use of a few hours.

Other objects and many of the attendant advantages of this invention will be readily appreciated as the same becomes better understood by reference to the following detailed description when considered in connection with the accompanying drawings in which like reference numerals refer to like parts throughout the figures and wherein:

Figure 1 is a perspective view of one form of the transducer with certain parts broken away to show constructional details;

Figure 2 is a central longitudinal cross sectional view of the transducer of Figure 1;

Figure 3 is a cross sectional view taken through 3—3 of Figure 2;

Figure 4 is a perspective view of a modification of the transducer of Figure 1 with certain parts broken away to show the construction;

Figure 5 is a transverse cross sectional view taken in a plane normal to the longitudinal axis of Figure 4.

Referring to Figures 1, 2 and 3, a supporting stem 10 is provided with cross arms 11 to which is secured by any suitable means, such as the screws 12, a cylindrical tube 13 formed from suitable magnetostrictive material.

A plurality of coils of wire 14 are wrapped around the tube 13 in the form of a toroid. Each coil is wound about the wall of the tube 13 and extends substantially parallel to the axis of the tube. Thus, each coil lies both inside and outside of its portion of the tube wall.

Since the axial length of the magnetostrictive tube 13 is small relative to the wave length of sound in the transmitting medium, it is necessary to prevent the cancellation of sound pressure on the outer surface of the wall by the sound pressure entering the open ends of the tube and acting on the inner surface of the same wall. By inserting a pressure-relieving layer 15 of suitable resilient material, such as air-cell rubber, on one periphery or surface of the tube wall between it and one side of the coils 14, sound cancellation is minimized.

This rubber layer 15 may be interposed between the inner periphery or wall of the tube 13 and the windings, or between the outer surface or wall and the windings, as shown in the drawings, without affecting the operation of the transducer.

The wire coils 14 terminate in a pair of leads 16 which are passed through an axial bore 17 of the stem 10 and are adapted to be connected either to a suitable source of alternating energy, or to any suitable detecting apparatus such as shown in Patent No. 2,005,741 issued on June 25, 1935, to H. C. Hayes for a Magnetostrictive Sound Generator.

The transducer as illustrated can be suspended directly into the water where it can be used either to project or to detect sounds. No protection is provided for the transducer against the deteriorating action of the water for this type of transducer is intended to be expendable and need only withstand such action for a few hours.

However, the transducer can be provided with the necessary protection by merely enclosing it in any suitable container.

The tube 13 is formed from magnetostrictive material that may be either annealed nickel or some substance having high magnetic retentivity, such as a composition of 49% Fe, 49% Co and 2% V, commercially known as Permendur. If nickel is used, a polarizing current is applied to the winding to provide the necessary magnetic flux. If permendur is used, the material can be magnetized on assembly and the polarizing current eliminated.

For efficiency and high output, the radius of the underwater transducer approximates the wave length of sound in water and is such that the water impedance looking out from the transducer throughout its frequency range will appear as a negative stiffness reactance. This apparent negative stiffness reactance can be balanced out by the positive stiffness reactance of the transducer resulting in a more-or-less pure resistance load. This produces a wider frequency response band than heretofore possible. A transducer of such suitable dimensions is approximately 5″ long and 3″ in diameter with a wall thickness of .35″.

The modification of Figure 4 employs a separate permanent magnet as a source of magnetic flux or polarizing field for the magnetostrictive tube.

The tube 20 is also of suitable magnetostrictive material, such as annealed nickel, and is mounted on a stem support 21 and arms 22 similarly to the tube 13. The tube 20 is provided with a longitudinal slot 23 fitted with soft iron pole pieces 24 within which is inserted a permanent magnet 25 to supply the necessary polarizing magnetic flux.

As in the previous embodiment, a pressure-relieving layer 26 is inserted between the tube 20 and the coil windings 27.

The efficiencies of two tubular hydrophones can be compared below the resonant frequency of the larger if all other conditions are the same, by a consideration of their radii; the ratios of the efficiencies being expressed by the term $(r_1/r_2)^3$.

The increase in efficiency is due to the decreased stiffness of the hydrophone having the larger radius and the resultant greater internal strain in the magnetostrictive material for the same external pressure. Since the magnetic flux variation and the voltage generated thereby in the winding are directly proportional to the strain, the hydrophone having the lower stiffness will be the more efficient. In the case of two tubular hydrophones, the length of the flux path is greater in the larger hydrophone; hence the inductance is greater.

It sould be understood, of course, that although the foregoing disclosure relates to preferred embodiments of the invention, numerous modifications or alterations may be made therein without departing from the spirit and the scope of the invention as set forth in the appended claims.

What is claimed is:

1. A sound transducer comprising a first hollow tubular member having a plurality of spaced radial ribs extending outwardly therefrom, a second hollow tubular member made of a magnetostrictive material coaxially surrounding said latter tubular member and fixedly connected to said radial ribs, a plurality of conductor windings coiled through, and about the periphery of, said second hollow tubular member to form a toroidal coil, an end lead of said coil extending through said first hollow tubular member.

2. A sound transducer comprising a first hollow tubular member having a plurality of spaced radial ribs extending outwardly therefrom, a second hollow tubular member made of a magnetostrictive material coaxially surrounding said latter tubular member and fixedly connected to said radial ribs, a plurality of conductor windings coiled through, and about the periphery of, said second hollow tubular member to form a toroidal coil, an end lead of said coil extending through said first hollow tubular member, and a third tubular member comprising a resilient pressure-relieving material sandwiched between the toroidal coil and said second tubular member.

NATIONAL BANK OF COMMERCE,
By ELSIE M. FLETCHER,
    *Assistant Trust Officer*,
*Administrator of estate of Albert L. Thuras, deceased.*

REFERENCES CITED

The following references are of record in the file of this patent:

UNITED STATES PATENTS

| Number | Name | Date |
| --- | --- | --- |
| 2,076,330 | Wood | Apr. 6, 1937 |
| 2,269,760 | Eldredge | Jan. 13, 1942 |
| 2,391,678 | Bundy | Dec. 23, 1945 |
| 2,431,026 | Bundy | Nov. 18, 1947 |